United States Patent
Goglin et al.

(10) Patent No.: US 8,150,981 B2
(45) Date of Patent: *Apr. 3, 2012

(54) FLEXIBLE AND EXTENSIBLE RECEIVE SIDE SCALING

(75) Inventors: Stephen D. Goglin, Hillsboro, OR (US); Linden Cornett, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 291 days.

This patent is subject to a terminal disclaimer.

(21) Appl. No.: 12/549,891

(22) Filed: Aug. 28, 2009

(65) Prior Publication Data

US 2010/0061377 A1    Mar. 11, 2010

Related U.S. Application Data

(63) Continuation of application No. 11/478,147, filed on Jun. 28, 2006, now Pat. No. 7,584,286.

(51) Int. Cl.
G06F 15/16 (2006.01)

(52) U.S. Cl. ......... 709/228; 709/223; 370/218; 370/355

(58) Field of Classification Search .................. 709/228, 709/223; 370/218, 355
See application file for complete search history.

(56) References Cited

U.S. PATENT DOCUMENTS

| | | | |
|---|---|---|---|
| 6,085,328 A | | 7/2000 | Klein et al. |
| 6,128,296 A | * | 10/2000 | Daruwalla et al. ............ 370/389 |
| 6,603,765 B1 | * | 8/2003 | Wilford et al. ............ 370/395.32 |
| 7,366,092 B2 | * | 4/2008 | Moll et al. ..................... 370/218 |
| 7,466,703 B1 | * | 12/2008 | Arunachalam et al. ....... 370/392 |
| 7,492,708 B2 | * | 2/2009 | Ge et al. ......................... 370/229 |
| 7,584,286 B2 | | 9/2009 | Goglin et al. |
| 2002/0116527 A1 | * | 8/2002 | Chen et al. .................... 709/245 |
| 2003/0018691 A1 | | 1/2003 | Bono |
| 2004/0024873 A1 | | 2/2004 | DiMambro |
| 2005/0243827 A1 | | 11/2005 | Rhoades |
| 2006/0195698 A1 | * | 8/2006 | Pinkerton et al. ............. 713/181 |
| 2007/0115982 A1 | | 5/2007 | Pope et al. |

FOREIGN PATENT DOCUMENTS

| | | |
|---|---|---|
| WO | 03/036902 A2 | 5/2003 |
| WO | 2008/002945 A1 | 1/2008 |

OTHER PUBLICATIONS

Notice of Allowance received for U.S. Appl. No. 11/478,147, mailed on Oct. 7, 2008, pp. 7.

Non-Final Office Action received for U.S. Appl. No. 11/478,147, mailed on Dec. 9, 2008, pp. 4.

Notice of Allowance received for U.S. Appl. No. 11/478,147, mailed on Apr. 7, 2009, pp. 7.

(Continued)

*Primary Examiner* — Krisna Lim

(74) *Attorney, Agent, or Firm* — Grossman, Tucker, Perreault & Pfleger, PLLC

(57) ABSTRACT

In an embodiment, a method is provided. The method of this embodiment provides in response to receiving a packet, looking up a packet characteristic in one of at least one protocol table to determine one or more fields of the packet to use as a hash value, applying a hash function to the hash value to obtain a hash result, and using the hash result to determine one of a plurality of processors on which to process the packet.

22 Claims, 5 Drawing Sheets

OTHER PUBLICATIONS

International Search Report and Written Opinion for PCT Patent Application No. PCT/US2007/072165, Mailed on Nov. 13, 2007, pp. 11.

International Preliminary Report on Patentability for PCT Patent Application No. PCT/US2007/072165, Mailed on Jan. 15, 2009, 8 pages.

Office Action Received for Chinese Patent Application No. 200780019526.2, mailed on Jan. 27, 2011, 7 pages of Office Action and 6 pages of English Translation.

Taiwanese Office Action dated Jun. 17, 2011 issued in related Taiwanese Patent Application No. 096123337.

* cited by examiner

FLEXIBLE AND EXTENSIBLE RECEIVE SIDE SCALING

RELATED APPLICATIONS

This application claims priority to and is a continuation of U.S. patent application Ser. No. 11/478,147, titled "FLEXIBLE AND EXTENSIBLE RECEIVE SIDE SCALING", which was filed on Jun. 28, 2006; this application is entirely incorporated by reference.

FIELD

Embodiments of this invention relate to flexible and extensible receive side scaling.

BACKGROUND

Multi-processor systems have become commonplace in the last few years, enabling multiple concurrent processes in the system to achieve higher speed networking. To achieve optimal use of this architecture, a technology known as Receive Side Scaling (hereinafter "RSS") may be used to enable receive-processing to scale with the number of available computer processors by allowing the network load from a network controller to be balanced across multiple processors. RSS is described in "Scalable Networking: Eliminating the Receive Processing Bottleneck—Introducing RSS", WinHEC (Windows Hardware Engineering Conference), Apr. 19, 2005 (hereinafter "the WinHEC Apr. 19, 2005 white paper"). RSS is part of the Network Device Interface Specification (hereinafter "NDIS") 6.0, available from Microsoft® Windows®. NDIS 6.0 provides for a device driver that enables a single network controller to support multiple network protocols, or that enables multiple network controllers to support multiple network protocols. NDIS 6.0 is currently still in the works, but information about it is available from Microsoft® Corporation of Redmond, Wash.

Systems that implement RSS currently only support a limited number of protocols supported by RSS. For example, in current RSS designs, only IPv4/v6 protocols at Network Layer, and TCP and UDP at Transport Layer, are supported. Generally, packets that conform to one of the supported protocols are hashed to determine which processor will process a given packet, and packets that do not conform to one of the supported protocols are sent to a default processor. Packets that do not conform to one of the supported protocols, therefore, may accumulate and result in bottlenecks of the default processor.

BRIEF DESCRIPTION OF THE DRAWINGS

Embodiments of the present invention are illustrated by way of example, and not by way of limitation, in the figures of the accompanying drawings and in which like reference numerals refer to similar elements and in which.

DETAILED DESCRIPTION

Examples described below are for illustrative purposes only, and are in no way intended to limit embodiments of the invention. Thus, where examples may be described in detail, or where a list of examples may be provided, it should be understood that the examples are not to be construed as exhaustive, and do not limit embodiments of the invention to the examples described and/or illustrated.

Figure 1:
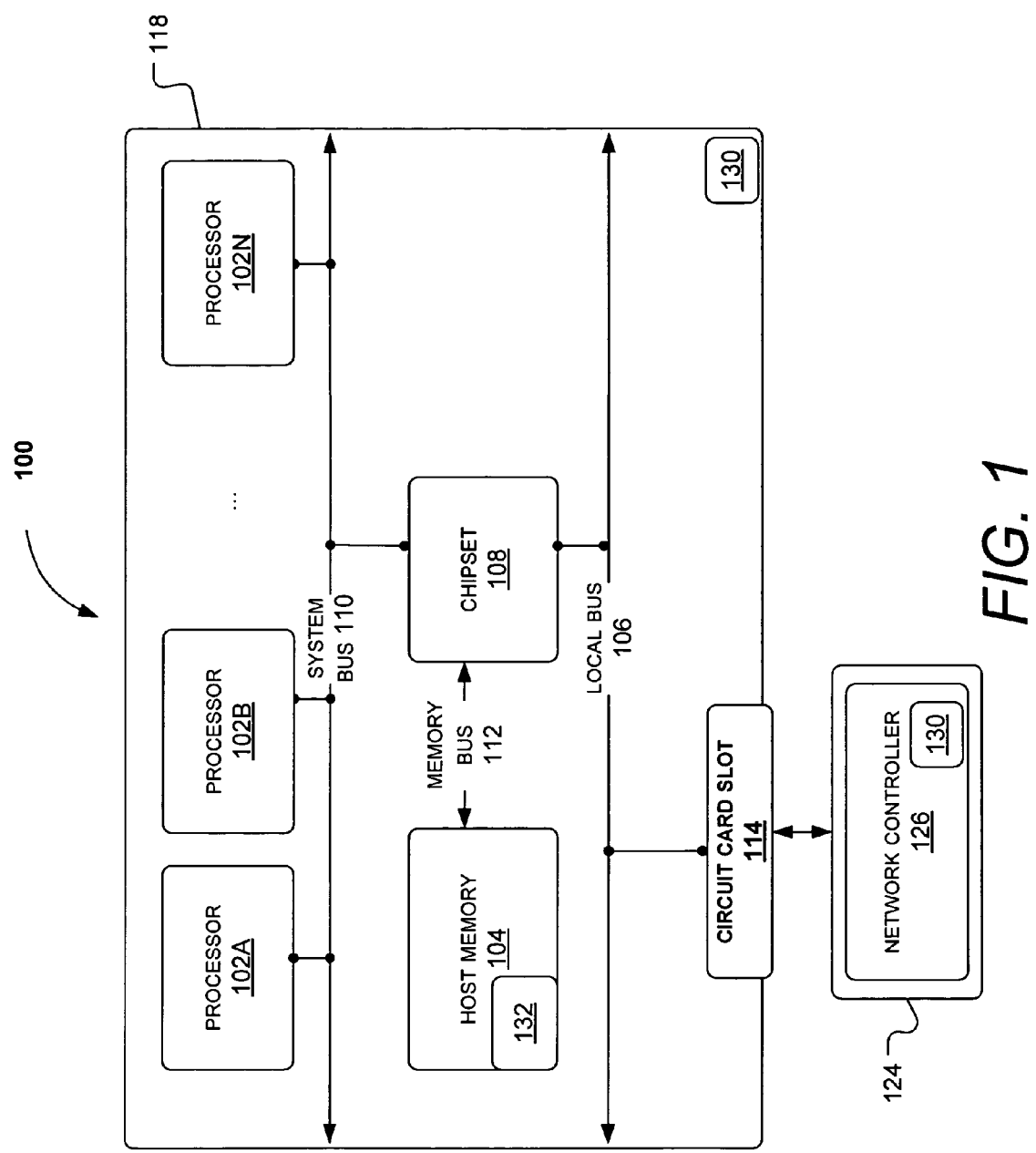
FIG. 1 illustrates a system according to an embodiment.

FIG. 1 illustrates a system in an embodiment. System 100 may comprise one or more processors 102A, 102B, ..., 102N, host memory 104, busses 106, 110, 112 and network controller 126. System 100 may comprise more than one, and other types of memories, buses, and network controllers; however, those illustrated are described for simplicity of discussion. Processors 102A, 102B, ..., 102N, host memory 104, and busses 106, 110, 112 may be comprised in a single circuit board, such as, for example, a system motherboard 118.

A "processor" as discussed herein relates to a combination of hardware and software resources for accomplishing computational tasks. For example, a processor may comprise a system memory and processing circuitry (e.g., a central processing unit (CPU) or microcontroller) to execute machine-readable instructions for processing data according to a predefined instruction set. Alternatively, a processor may comprise just the processing circuitry (e.g., CPU). A processor may comprise a multi-core processor having a plurality of computational engines. Alternatively, a processor may comprise a computational engine that may be comprised in the multi-core processor, where an operating system may perceive the computational engine as a discrete processor with a full set of execution resources. Other possibilities exist.

System may comprise logic 130. Logic 130 may comprise hardware, software, or a combination of hardware and software (e.g., firmware). For example, logic 130 may comprise circuitry (i.e., one or more circuits), to perform operations described herein. For example, logic 130 may comprise one or more digital circuits, one or more analog circuits, one or more state machines, programmable logic, and/or one or more ASIC's (Application-Specific Integrated Circuits). Logic 130 may be hardwired to perform the one or more operations. Alternatively or additionally, logic 130 may be embodied in machine-executable instructions 132 stored in a memory, such as memory 104, to perform these operations. Alternatively or additionally, logic 130 may be embodied in firmware. Logic may be comprised in various components of system 100, including network controller 126, chipset 108, processors 102A, 102B, ..., 102N, and/or on motherboard 118. Logic 130 may be used to perform various functions by various components as described herein.

Chipset 108 may comprise one or more integrated circuit chips, such as those selected from integrated circuit chipsets commercially available from Intel® Corporation (e.g., graphics, memory, and I/O controller hub chipsets), although other one or more integrated circuit chips may also, or alternatively, be used. According to an embodiment, chipset 108 may comprise an input/output control hub (ICH), and/or a memory control hub (MCH), although embodiments of the invention are not limited by this. Chipset 108 may comprise a host bridge/hub system that may couple processor 102A, 102B, ..., 102N, and host memory 104 to each other and to local bus 106. Chipset 108 may communicate with memory 104 via memory bus 112 and with processors 102A, 102B, ..., 102N via system bus 110. In alternative embodiments, processor 102 and host memory 104 may be coupled directly to bus 106, rather than via chipset 108.

Local bus 106 may comprise a bus that complies with the Peripheral Component Interconnect (PCI) Local Bus Specification, Revision 2.2, Dec. 18, 1998 available from the PCI Special Interest Group, Portland, Oreg., U.S.A. (hereinafter referred to as a "PCI bus"). Alternatively, for example, bus 106 may comprise a bus that complies with the PCI Express Base Specification, Revision 1.0a, Apr. 15, 2003 available from the PCI Special Interest Group (hereinafter referred to as a "PCI Express bus"). Bus 106 may comprise other types and configurations of bus systems.

Network controller 126 may be comprised in a circuit card 124 (i.e., network interface card or NIC) that may be inserted into a circuit card slot 114. A "network controller" as referred to herein relates to a device which may be coupled to a data transmission medium to transmit data to or receive data from other devices coupled to the data transmission medium. For example, a network controller may be designed to transmit data to or receive data from devices coupled to a network such as a local area network. Such a network controller may communicate with the other devices according to any one of several data communication formats such as, for example, communication formats according versions of IEEE Std. 802.3 (Ethernet), IEEE Std. 802.11, IEEE Std. 802.16, Universal Serial Bus, Firewire, asynchronous transfer mode (ATM), synchronous optical network (SONET) or synchronous digital hierarchy (SDH) standards. In alternative embodiments, a network controller may comprise any one of other I/O devices such as, for example, a controller to a data storage system. However, these are merely examples of a network controller and embodiments of the present invention are not limited in these respects.

Network controller 126 may comprise logic 130 to perform operations described herein as being performed by network controller 126 and/or system 100. When circuit card 124 is inserted into circuit card slot 114, PCI bus connector (not shown) on circuit card slot 114 may become electrically and mechanically coupled to PCI bus connector (not shown) on circuit card 124. When these PCI bus connectors are so coupled to each other, logic 130 in circuit card 124 may become electrically coupled to bus 106. When logic 130 is electrically coupled to bus 106, any of processors 102A, 102B, . . . , 102N may exchange data and/or commands with logic 130 via bus 106 that may permit one or more processors 102A, 102B, . . . , 102N to control and/or monitor the operation of logic 130. Rather than reside on circuit card 124, network controller 126 may instead be comprised on system motherboard 118. Alternatively, network controller 126 may be integrated into a chipset 108.

Host memory 104 may store machine-executable instructions 132 that are capable of being executed, and/or data capable of being accessed, operated upon, and/or manipulated by logic, such as logic 130. Host memory 104 may, for example, comprise read only, mass storage, random access computer-accessible memory, and/or one or more other types of machine-accessible memories. The execution of program instructions 132 and/or the accessing, operation upon, and/or manipulation of this data by logic 130 for example, may result in, for example, system 100 and/or logic 130 carrying out some or all of the operations described herein.

Figure 2:
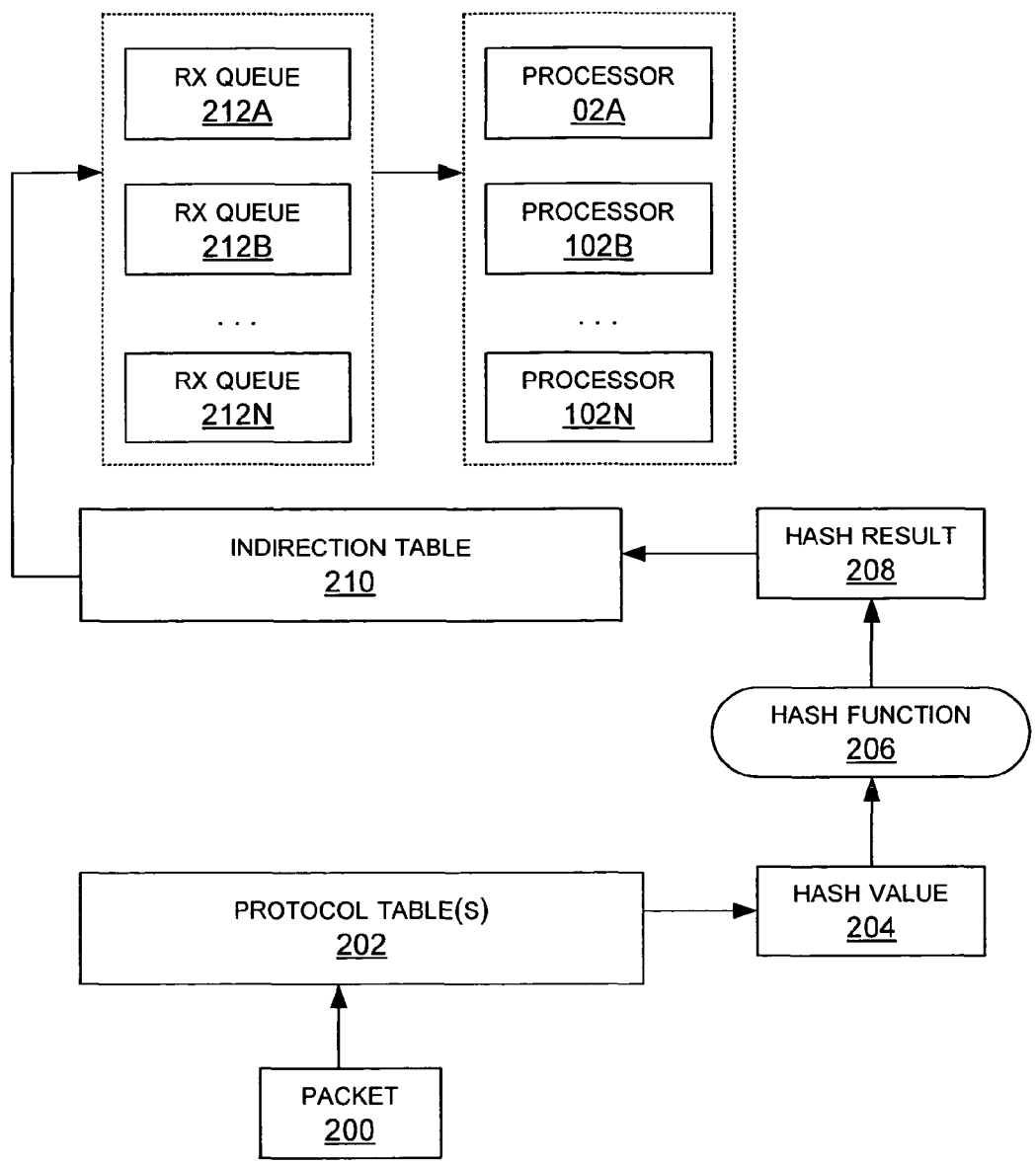
FIG. 2 is a block diagram that illustrates a system according to an embodiment.

FIG. 2 is a block diagram in accordance with an embodiment of the invention. In an embodiment, protocol table(s) 202, indirection table 210, and hash function 206 may be implemented on network controller 126, and receive queues 212A, 212B, . . . , 212N may be implemented in host memory 104.

Figure 3:
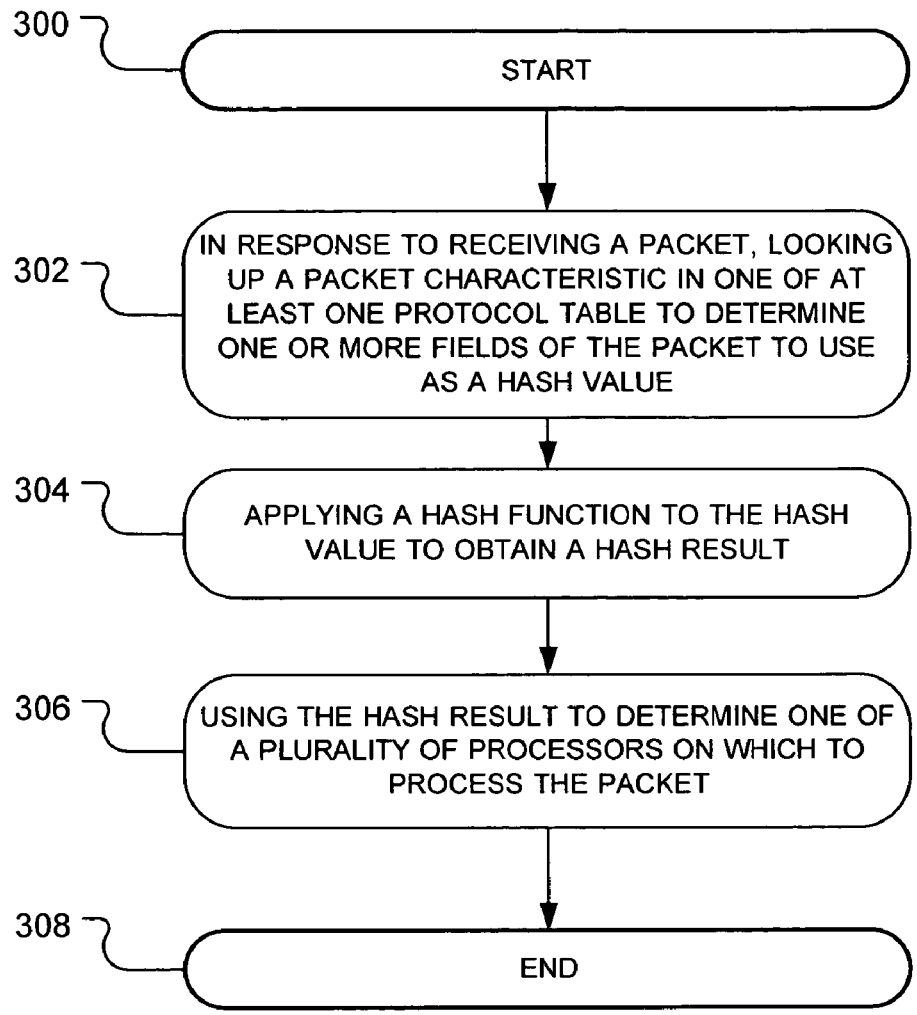
FIG. 3 is a flowchart illustrating a method according to an embodiment.

FIG. 3 illustrates a method in accordance with an embodiment of the invention. The method begins at block 300 and continues to block 302 where the method may comprise in response to receiving a packet, looking up a packet characteristic in one of at least one protocol table to determine one or more fields of the packet to use as a hash value.

A "packet" refers to a sequence of one or more symbols and/or values that may be encoded by one or more signals transmitted from at least one sender to at least one receiver. A packet may be processed by a particular protocol stack. An example of a protocol stack is the TCP/IP (Transport Control Protocol/Internet Protocol) stack. A packet may comprise one or more fields, including a header, data, and a trailer. Within the header may be additional fields. In an IP packet, for example, the header may include an IP version, packet length, source IP address, and destination IP address. Fields may be identified by a set of bits. For example, the IP version field may comprise the first 4 bits of the IP header, and the source and destination IP addresses may comprise the last 64 bits of the IP header.

A packet may be encapsulated in many layers, where each layer may be associated with a protocol. As used herein, a packet that is associated with a protocol refers to a packet within a particular layer that is associated with a particular protocol. For example, packet 200 may comprise an Ethernet packet that includes, for example, a TCP packet (having a header, data, and trailer, for example) that is encapsulated within an IP packet (having a header, data, and trailer, for example, where the data portion of the IP packet comprises the TCP packet). In this example, packet 200 may be associated with the IP protocol as well as the TCP protocol. Depending on the protocol suite used, there may be several other layers of encapsulation.

A "packet characteristics" refers to a characteristic of a packet. These characteristics may, for example, by seen in one or more layers. For example, several layers may have packet characteristics including the protocol for the layer, and source and destination addresses or ports.

Figure 4:
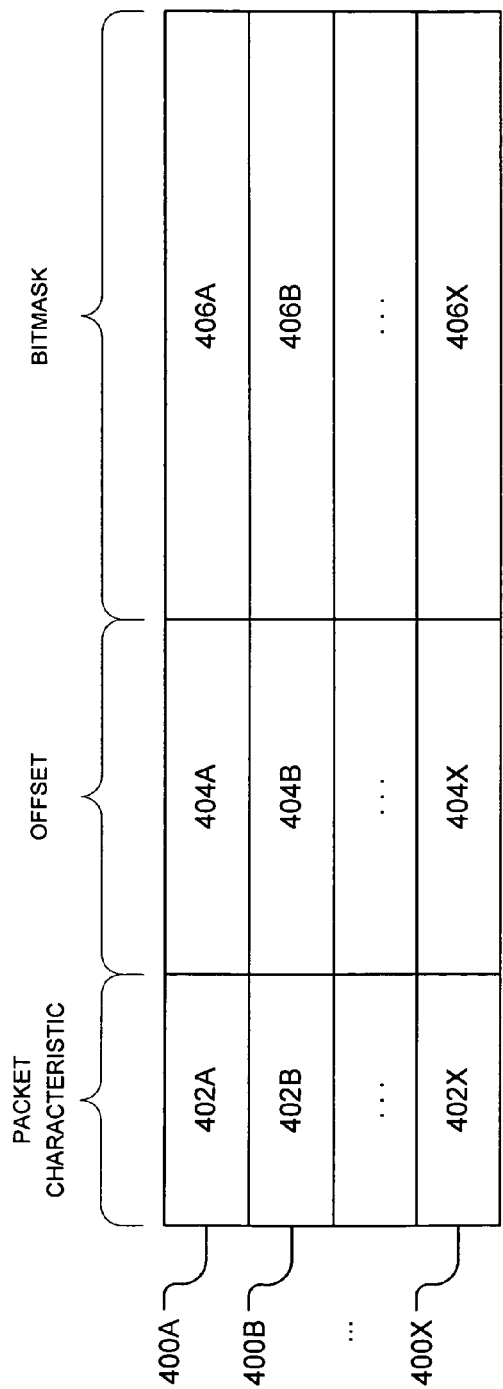
FIG. 4 a protocol table according to an embodiment.

As illustrated in FIG. 4, each of at least one protocol table(s) 202 may comprise entries 400A, 400B, . . . , 400X, where each entry may comprise a packet characteristic 402A, 402B, . . . , 402X corresponding to an offset 404A, 404B, . . . , 404X and mask 406A, 406B, . . . , 406X. Protocol table(s) 202 may be configured to comprise any number of packet characteristics, and the packet characteristics may differ (e.g., protocol, destination port, etc.). Protocol table(s) 202 may comprise a single table to accommodate all protocols. Alternatively, protocol table(s) 202 may comprise multiple tables, where each protocol table(s) 202 may correspond to a packet characteristic for a given layer. Furthermore, the packet characteristics for each layer may differ.

The offset 404A, 404B, . . . , 404X may specify a distance (e.g., bits) from a start bit in packet 200 (e.g., end of a packet header) to which mask 406A, 406B, . . . , 406X (e.g., bitmask) may be applied to ascertain hash value 204. For example, the start bit may comprise the beginning of a packet (e.g., byte 0), the offset may specify 20 bits, and the bitmask may comprise 32 bits. In this case, bits 19 to 50 may be hashed to generate hash value 204. As another example, the start bit may comprise the end of packet 200 header (e.g., bit 112), the offset may specify 0 bits, and the bitmask may comprise 32 bits. In this case, bits 112-143 may be masked to generate hash value 204. The start bit may be specified by default. For example, the beginning of the packet may be specified as the start bit. Furthermore, the start bit may be dependent on the layer. Alternatively, the start bit may be programmable. For example, start bit may be defined in a table, such as any of protocol table(s) 202.

For example, if packet 200 is associated with the MPLS protocol, then the MPLS protocol may be looked up in one of protocol table(s) 202. Protocol table(s) 202 may comprise an entry, for example entry 400A for the MPLS packet characteristic 402A, where offset 404A may comprise "OFFSET:

0x0", and mask 406A may comprise "MASK: 0xFF:FF:F0: 00". If the start bit comprises the end of the packet header (e.g., bit 112), then this entry would result in masking the bits 112-143, which would result in hash value 204 comprising the top label of the MPLS stack.

Looking up a packet characteristic in one of at least one protocol table(2) 202 to determine one or more fields of the packet 200 to use as a hash value 204 may comprise an iterative process. In an embodiment, for example, a next layer of packet 200 may be revealed until there are no further layers to reveal. In an embodiment, there are no further layers to reveal if a given implementation designates a particular layer as the last layer in which to examine the packet characteristics (e.g., after Transport Layer is exposed, there are no further layers to reveal). As another example, there may be no further layers to reveal if an exposed protocol is an unsupported protocol. An "exposed protocol" may refer to the protocol for the currently revealed layer, or a next layer protocol that may be indicated in the currently revealed layer.

If the exposed protocol is a supported protocol, then one or more default fields of the packet may be obtained. (If the exposed protocol is the first layer that is revealed, and it is not a supported protocol, then no default fields are obtained, and the packet may be sent to a default processor for processing packets that cannot be classified.) In current RSS designs, for example, the default fields may be the IP source and destination addresses for the IP protocol at the Network Layer, or the TCP source and destination ports for the TCP protocol at the Transport Layer.

As used herein, an "unsupported protocol" refers to a protocol that the system does not natively support. Systems that implement current RSS designs, for example, natively support IPv4/v6, TCP, and UDP by hardwiring the system to understand those protocols, or otherwise shipping the systems to understand those protocols ("supported protocols"). All other protocols exposed at the various layers would be unsupported.

If there are no further layers to reveal, the packet characteristic corresponding to the last revealed layer may be looked up in one of the at least one protocol table to obtain an offset and a mask. If the packet characteristic is found, the offset and the mask may then be applied to the packet. If the packet characteristic is not found in the one of at least one protocol table(s) 202, then the one or more default fields obtained in the iterative process above may be used as hash value 204. If no default fields were obtained the packet may be sent to a default one of the plurality of processors.

By specifying an offset and mask to default field(s), the fields used for hash value 204 may be customized, allowing packet 200 to be classified in different ways. For example, rather than send TCP packets to processors based on their source/destination port, a particular system may want all SYN and FIN packets sent to a particular processor. To do this, an entry 400A, 400B, . . . , 400X in one of protocol table(s) 202 may be set to the IP protocol number for TCP, where the offset and mask for the entry could be defined to result in masking out all bits of the TCP packet except for the SYN and FIN flags.

As another example, some applications and/or protocols open up many TCP connections to another system to establish a single logical data connection. Since the TCP source ports may be randomly chosen by the system, the hash of the TCP packet may likely result in packets from some connections in the plurality of TCP connections to go to different processors than other connections. This would result in severe locality penalties since a single logical connection would need to bounce around between processors. To resolve this conflict, one of protocol table(s) 202 may be configured to include an entry for different TCP destination ports, where the entry would result in masking out the source port field (i.e., bits) and allow all connections from the same TCP port to hash to the same processor. Other protocol table(s) 202 configurations to achieve this are possible.

At block 304, the method may comprise applying a hash function to the hash value to obtain a hash result. Referring back to FIG. 2, hash value 204 may be hashed using hash function 206 to obtain hash result 208. The hash function may comprise a Toeplitz hash as described in the WinHEC Apr. 19, 2005 white paper.

At block 306, the method may comprise using the hash result to determine one of a plurality of processors on which to process the packet. As illustrated in FIG. 2, indirection table 210 may be used to direct packets 200 to a receive queue 212A, 212B, . . . , 212N. Indirection table 210 may comprise one or more entries, where each entry may comprise a hash result 208 that corresponds to a receive queue 212A, 212B, . . . , 212N. Each receive queue 212A, 212B, . . . , 212N may store one or more receive packets 200 and may correspond to one of processors 102A, 102B, . . . , 102N that may process those one or more packets 200 received from a given receive queue 212A, 212B, . . . , 212N. Indirection table 210 may be configured so that certain hash results (corresponding to particular packets 200) may correspond to particular processors (so that the corresponding packets 200 are sent to those processors.

The method may end at block 308.

Figure 5:
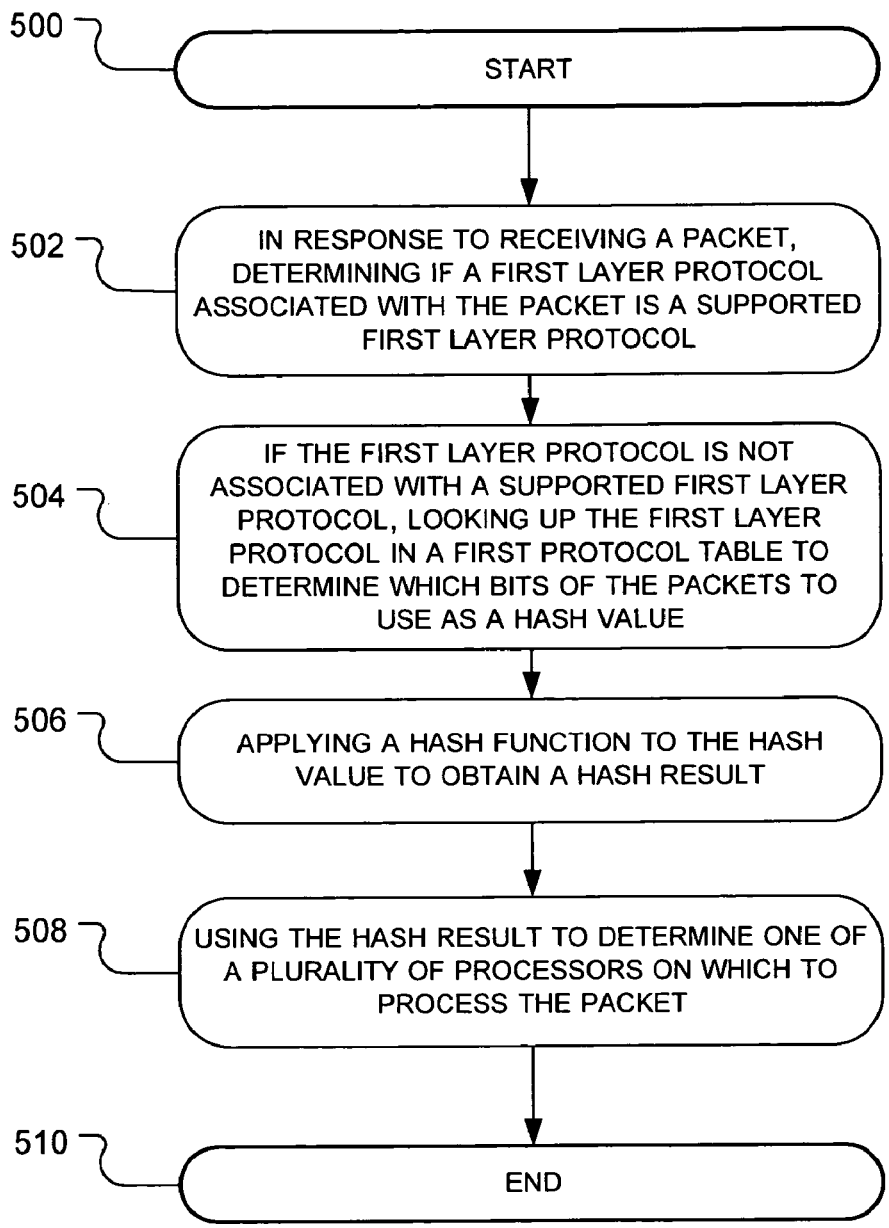
FIG. 5 is a flowchart illustrating a method according to an embodiment.

In an embodiment, the method described above may be employed in an RSS environment. As illustrated in FIG. 5, such method may begin at block 500 and continue to block 502 where in response to receiving a packet, the method may comprise determining if a first layer protocol associated with the packet is a supported first layer protocol. For example, the first layer may comprise Network Layer, and supported Network Layer protocols in RSS may include IPv4/v6.

At block 504, the method may comprise if the first layer protocol is not associated with a supported first layer protocol, looking up the first layer protocol in a first protocol table to determine which bits of the packets to use as a hash value. For example, if the Network Layer protocol of the packet is not an IPv4/v6 packet, the Network Layer protocol associated with the packet may be looked up in a protocol table. In an embodiment, for example, the first protocol table may comprise an Ethernet Type table that comprises unsupported Network Layer protocols, such as MPLS (Multiprotocol Label Switching).

Alternatively, if the first layer protocol is associated with a supported first layer protocol, a first set of bits associated with the first layer protocol may be obtained, and it may then be determined if a second layer protocol associated with the packet is a supported second layer protocol.

If the second layer protocol is not associated with a supported second layer protocol, then the second layer protocol is looked up in a second protocol table to determine a hash value. For example, the second layer may comprise the Transport Layer, and supported Transport Layer protocols in RSS may include TCP and UDP. Therefore, for example, if the Transport Layer protocol of the packet is not a TCP or UDP packet, the unsupported Transport Layer protocol may be looked up in a second protocol table. In an embodiment, for example, the second protocol table may comprise an IP table that comprises specific Transport Layer protocols, such as IPSec (Internet Protocol Security). Protocol table(s) 202 may comprise an entry, for example entry 400B for the IPSec protocol 402B, where offset 404B may comprise "offset:

0x0", and mask 406B may comprise "mask: 0xFF:FF:FF: FF". If the start bit comprises the end of the IP header, then this entry would result in hashing only the bits of the SPI (Security Parameter Index) of the packet.

If the second layer protocol is associated with a supported second layer protocol, a second set of bits associated with the second layer protocol may be obtained, and then the second layer protocol may be looked up in a third protocol table to determine a hash value. For example, the second layer may comprise Transport Layer, and supported Transport Layer protocols in RSS may include TCP and UDP. Therefore, for example, if the Transport Layer protocol of the packet is a TCP or UDP packet, the Transport Layer protocol may be looked up in a protocol table.

At block 506, the method may comprise applying a hash function to the hash value to obtain a hash result. As described above, hash value 204 may be derived from one of protocol table(s) 202. For supported protocols, hash value 204 may be obtained from default fields only, or a combination of default fields and one of protocol table(s) 202.

At block 508, the method may comprise using the hash result to determine one of a plurality of processors on which to process the packet. In an RSS system, hash result 208 may be mapped to an entry in an indirection table 210 to obtain a result. The result may be added to another variable to obtain a value corresponding to a receive queue 212A, 212B, . . . , 212N. The other variable may comprise, for example, a base processor number which may indicate the lowest number of processors that can be used in RSS, and which may be implementation-specific. The base processor number may be, for example, 0. Network controller 126 may transfer the packet 200 to the receive queue 212A, 212B, . . . , 212N corresponding to hash result 208.

The method may end at block 510.

CONCLUSION

Therefore, in an embodiment, a method may comprise in response to receiving a packet, looking up a packet characteristic in one of at least one protocol table to determine one or more fields of the packet to use as a hash value, applying a hash function to the hash value to obtain a hash result, and using the hash result to determine one of a plurality of processors on which to process the packet.

Embodiments of the invention may enable a receive side processing of packets to be scaled to the number of processors in a system in a flexible and extensible manner. Rather than limit the supported protocols to what is already hardwired, or otherwise programmed into the system, embodiments of the invention provide a way for the protocols to be easily added and easily configured. Furthermore, embodiments of the invention enable multi-processor systems to be optimized by not only supporting different protocols, but also by enabling the classification of packets in a way that allows the packets to be distributed across different processors.

In the foregoing specification, the invention has been described with reference to specific embodiments thereof. It will, however, be evident that various modifications and changes may be made to these embodiments without departing therefrom. The specification and drawings are, accordingly, to be regarded in an illustrative rather than a restrictive sense.

What is claimed is:

1. A computer implemented method for distributing packets across a plurality of processors of a computer, said method comprising:

in response to receiving a packet, looking up a packet characteristic in one of at least one protocol table stored on a computer readable memory to determine one or more fields of the packet to use as a hash value;

applying a hash function to the hash value to obtain a hash result;

using the hash result to determine one of said plurality of processors on which to process the packet; and transmitting said packet to said determined one of said plurality of processors.

2. The method of claim 1, wherein said looking up a packet characteristic in one of at least one protocol table to determine one or more fields of the packet to use as a hash value comprises:

obtaining an offset and a mask corresponding to the packet characteristic; and applying the mask to the packet at a start bit of the packet plus the offset.

3. The method of claim 2, wherein the packet characteristic comprises a protocol.

4. The method of claim 2, wherein the packet characteristic comprises a port identifier.

5. The method of claim 1, wherein said looking up a packet characteristic in one of at least one protocol table to determine one or more fields of the packet to use as a hash value comprises:

performing the following until there are no further layers to reveal:
revealing a next layer to expose a protocol; and
if the exposed protocol is a supported protocol, obtaining one or more default fields of the packet;

setting the revealed next layer to the last revealed protocol;
looking up the packet characteristic corresponding to the last revealed layer in one of the at least one protocol table to obtain an offset and a mask; and
if the packet characteristic is found, applying the offset and the mask to the packet.

6. The method of claim 5, additionally comprising if the packet characteristic is not found in the one of at least one protocol table, then using the one or more default fields as the hash value.

7. The method of claim 6, wherein if there are no default fields, sending the packet to a default one of the plurality of processors.

8. An apparatus for distributing packets across a plurality of processors, said apparatus comprising:

a computer comprising said plurality of processors; and
logic configured to run on said computer, said logic configured to:

in response to receiving a packet, look up a packet characteristic in one of at least one protocol table stored on a computer readable memory to determine one or more fields of the packet to use as a hash value;

apply a hash function to the hash value to obtain a hash result; and use the hash result to determine one of said plurality of processors on which to process the packet; and transmit said packet to said determined one of said plurality of processors.

9. The apparatus of claim 8, wherein said looking up a packet characteristic in one of at least one protocol table to determine one or more fields of the packet to use as a hash value comprises:

obtaining an offset and a mask corresponding to the packet characteristic; and applying the mask to the packet at a start bit of the packet plus the offset.

10. The apparatus of claim 8, wherein said looking up a packet characteristic in one of at least one protocol table to determine one or more fields of the packet to use as a hash value comprises:
performing the following until there are no further layers to reveal:
revealing a next layer to expose a protocol; and
if the exposed protocol is a supported protocol, obtaining one or more default fields of the packet;
setting the revealed next layer to the last revealed protocol;
looking up the packet characteristic corresponding to the last revealed layer in one of the at least one protocol table to obtain an offset and a mask; and
if the packet characteristic is found, applying the offset and the mask to the packet.

11. The apparatus of claim 10, additionally comprising if the packet characteristic is not found in the one of at least one protocol table, then using the one or more default fields as the hash value.

12. The apparatus of claim 11, wherein if there are no default fields, sending the packet to a default one of the plurality of processors.

13. A system comprising:
a circuit card that is capable of being coupled to a circuit board via a circuit card slot of said circuit board, the circuit card including logic operable to:
in response to receiving a packet, look up a packet characteristic in one of at least one protocol table to determine one or more fields of the packet to use as a hash value;
in response to receiving a packet, look up a packet characteristic in one of at least one protocol table to determine one or more fields of the packet to use as a hash value
apply a hash function to the hash value to obtain a hash result; and
use the hash result to determine one of a plurality of processors on which to process the packet.

14. The system of claim 13, wherein said logic to look up a packet characteristic in one of at least one protocol table to determine one or more fields of the packet to use as a hash value comprises logic to:
obtain an offset and a mask corresponding to the packet characteristic; and
apply the mask to the packet at a start bit of the packet plus the offset.

15. The system of claim 13, wherein said logic to look up a packet characteristic in one of at least one protocol table to determine one or more fields of the packet to use as a hash value comprises logic to:
perform the following until there are no further layers to reveal:
revealing a next layer to expose a protocol; and
if the exposed protocol is a supported protocol, obtaining one or more default fields of the packet;
set the revealed next layer to the last revealed protocol;
look up the packet characteristic corresponding to the last revealed layer in one of the at least one protocol table to obtain an offset and a mask; and
if the packet characteristic is found, apply the offset and the mask to the packet.

16. The system of claim 15, additionally comprising if the packet characteristic is not found in the one of at least one protocol table, then using the one or more default fields as the hash value.

17. The system of claim 16, wherein if there are no default fields, sending the packet to a default one of the plurality of processors.

18. A system comprising:
a plurality of processors;
a plurality of receive queues, each of said plurality of receive queues associated with only one of said plurality of processors; and
a circuit card configured to receive a packet, the circuit card including logic operable to:
in response to receiving a packet, look up a packet characteristic in one of at least one protocol table to determine one or more fields of the packet to use as a hash value;
apply a hash function to the hash value to obtain a hash result;
use the hash result to determine one of said plurality of processors on which to process the packet; and
transmitting said packet to a receive queue associated with said determined one of said plurality of processors.

19. The system of claim 18, wherein said logic to look up a packet characteristic in one of at least one protocol table to determine one or more fields of the packet to use as a hash value comprises logic to:
obtain an offset and a mask corresponding to the packet characteristic; and
apply the mask to the packet at a start bit of the packet plus the offset.

20. The system of claim 18, wherein said logic to look up a packet characteristic in one of at least one protocol table to determine one or more fields of the packet to use as a hash value comprises logic to:
perform the following until there are no further layers to reveal:
revealing a next layer to expose a protocol; and
if the exposed protocol is a supported protocol, obtaining one or more default fields of the packet;
set the revealed next layer to the last revealed protocol;
look up the packet characteristic corresponding to the last revealed layer in one of the at least one protocol table to obtain an offset and a mask; and
if the packet characteristic is found, apply the offset and the mask to the packet.

21. The system of claim 20, additionally comprising if the packet characteristic is not found in the one of at least one protocol table, then using the one or more default fields as the hash value.

22. The system of claim 21, wherein if there are no default fields, sending the packet to a default one of the plurality of processors.

* * * * *